(12) United States Patent
Garret et al.

(10) Patent No.: US 9,377,252 B2
(45) Date of Patent: Jun. 28, 2016

(54) HEAT EXCHANGER AND CASING FOR THE HEAT EXCHANGER

(75) Inventors: Paul Garret, Veneux les Sablons (FR); Yoann Naudin, Saint-Loup-en-Champagne (FR); Philippe Faille, Reims (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 1156 days.

(21) Appl. No.: 13/001,183

(22) PCT Filed: Jun. 22, 2009

(86) PCT No.: PCT/EP2009/057739
§ 371 (c)(1),
(2), (4) Date: Mar. 28, 2011

(87) PCT Pub. No.: WO2010/003807
PCT Pub. Date: Jan. 14, 2010

(65) Prior Publication Data
US 2011/0168370 A1 Jul. 14, 2011

(30) Foreign Application Priority Data
Jun. 26, 2008 (FR) ..................... 08 03603

(51) Int. Cl.
*F28F 9/00* (2006.01)
*F28F 9/02* (2006.01)
(Continued)

(52) U.S. Cl.
CPC ............ *F28F 9/0219* (2013.01); *F28D 7/1684* (2013.01); *F28F 9/001* (2013.01); *F28F 9/0224* (2013.01); *F28D 21/0003* (2013.01); *F28F 2225/08* (2013.01); *F28F 2275/04* (2013.01);
(Continued)

(58) Field of Classification Search
CPC ....... F28F 9/0219; F28F 9/0224; F28F 9/001; F28F 2275/04; F28F 2275/122; F02M 25/0737; F28D 7/1684; F28D 21/0003; Y02T 10/121
USPC .......................................... 165/157, 158, 162
See application file for complete search history.

(56) References Cited

U.S. PATENT DOCUMENTS 2,596,233 A * 5/1952 Gardner ........................ 220/553
2,803,440 A * 8/1957 Simpelaar ..................... 165/179
(Continued)

FOREIGN PATENT DOCUMENTS

CA 2264458 A1 * 9/1999
DE 19902504 A1 8/2000
(Continued)

OTHER PUBLICATIONS

English language abstract for DE 19902504 extracted from the espacenet.com database on Jul. 7, 2011, 6 pages.
(Continued)

*Primary Examiner* — Tho V Duong
(74) *Attorney, Agent, or Firm* — Howard & Howard Attorneys PLLC

(57) ABSTRACT

The heat exchanger has exchange and fluid flow components (2, 2'), at least one fluid manifold (11) into which the exchange components (2, 2') open, at least one header plate (10) for holding the exchange components (2, 2'), and a casing (4) for accommodating the exchange components (2, 2'). According to the invention, the fluid manifold (11) is held directly by the casing (4). A compact heat exchanger is produced.

4 Claims, 5 Drawing Sheets

(51) Int. Cl.
  *F28D 7/16* (2006.01)
  *F28D 21/00* (2006.01)
(52) U.S. Cl.
  CPC .......... *F28F 2275/122* (2013.01); *Y02T 10/121* (2013.01)

(56) References Cited

U.S. PATENT DOCUMENTS

| | | | |
|---|---|---|---|
| 2,825,584 A * | 3/1958 | Badger et al. | 285/95 |
| 4,562,887 A * | 1/1986 | Muri | 165/158 |
| 4,848,448 A * | 7/1989 | Kaarre | 165/158 |
| 5,251,693 A * | 10/1993 | Zifferer | 165/160 |
| 5,915,472 A * | 6/1999 | Takikawa et al. | 165/158 |
| 7,077,190 B2 * | 7/2006 | Hayashi et al. | 165/159 |
| 7,128,137 B2 * | 10/2006 | Dilley et al. | 165/158 |
| 2002/0162651 A1 * | 11/2002 | Nakagome et al. | 165/158 |
| 2003/0010479 A1 | 1/2003 | Hayashi et al. | |
| 2003/0111209 A1 * | 6/2003 | Tsujita et al. | 165/51 |
| 2003/0196785 A1 | 10/2003 | Knecht et al. | |
| 2003/0230399 A1 * | 12/2003 | Hurlbert et al. | 165/104.25 |
| 2005/0189097 A1 | 9/2005 | Fowser et al. | |
| 2006/0048759 A1 | 3/2006 | Hendrix et al. | |
| 2006/0048921 A1 | 3/2006 | Usui et al. | |
| 2006/0219394 A1 | 10/2006 | Martin et al. | |
| 2006/0278377 A1 | 12/2006 | Martins et al. | |
| 2009/0200003 A1 * | 8/2009 | Digele | 165/158 |
| 2010/0089548 A1 | 4/2010 | Braic et al. | |
| 2011/0168365 A1 | 7/2011 | Garret et al. | |
| 2011/0168366 A1 | 7/2011 | Garret et al. | |
| 2011/0168370 A1 | 7/2011 | Garret et al. | |

FOREIGN PATENT DOCUMENTS

| | | | |
|---|---|---|---|
| DE | 19927607 | A1 | 12/2000 |
| DE | 102005042908 | A1 | 4/2006 |
| DE | 102005037156 | A1 | 2/2007 |
| EP | 1348924 | A2 | 10/2003 |
| FR | 2814537 | A1 | 3/2002 |
| FR | 2855605 | A1 | 12/2004 |
| FR | 2856747 | A1 | 12/2004 |
| JP | 62046194 | A * | 2/1987 |
| JP | 09089491 | | 4/1997 |
| JP | 09310996 | | 12/1997 |
| JP | 2000282963 | | 10/2000 |
| JP | 2000304486 | | 11/2000 |
| WO | WO 2004065874 | A1 | 8/2004 |
| WO | WO 2008125309 | A2 | 10/2008 |
| WO | WO2009156363 | A1 | 12/2009 |
| WO | WO2009156364 | A1 | 12/2009 |
| WO | WO2009156365 | A1 | 12/2009 |

OTHER PUBLICATIONS

English language abstract for DE 19927607 extracted from the espacenet.com database on Jul. 5, 2011, 9 pages.
English language abstract and equivalent for DE 102005042908 extracted from the espacenet.com database on Jul. 6, 2011, 23 pages.
English language abstract and equivalency for EP 1348924 extracted from the espacenet.com database on Jul. 5, 2011, 11 pages.
English language abstract for FR 2814537 extracted from the espacenet.com database on Jul. 7, 2011, 25 pages.
English language abstract for FR 2855605 extracted from the espacenet.com database on Jul. 6, 2011, 19 pages.
No English language abstract available for FR 2856747. However, see English language equivalency extracted from the espacenet.com database on Jul. 5, 2011, 31 pages.
English language translation for JP 09089491 extracted from the PAJ database on Jul. 6, 2011, 21 pages.
English language translation for JP 2000282963 extracted from the PAJ database on Jul. 6, 2011, 18 pages.
English language translation for JP 2000304486 extracted from the PAJ database on Jul. 5, 2011, 25 pages.
English language abstract and equivalent for WO 2004065874 extracted from the espacenet.com database on Jul. 7, 2011, 35pages.
English language abstract and equivalent for WO 2008125309 extracted from the espacenet.com database on 7/6/201, 50 pages.
Traite de Cooperation en Matiere De Brevets International Search Report for Application No. PCT/EP2009/057739 dated Oct. 23, 2009, 6 pages.
Traite de Cooperation en Matiere De Brevets International Search Report for Application No. PCT/EP2009/057740 dated Sep. 18, 2009, 4 pages.
Traite De Cooperation en Matiere De Brevets International Search Report for Application No. PCT/EP2009/057741, dated Sep. 9, 2009, 3 pages.
Traite De Cooperation en Matiere De Brevets International Search Report for Application No. PCT/EP2009/057742 dated Sep. 18, 2009 4 pages.
English language translation for JP 09310996 extracted from the PAJ database on Jul. 6, 2011, 22 pages.

\* cited by examiner

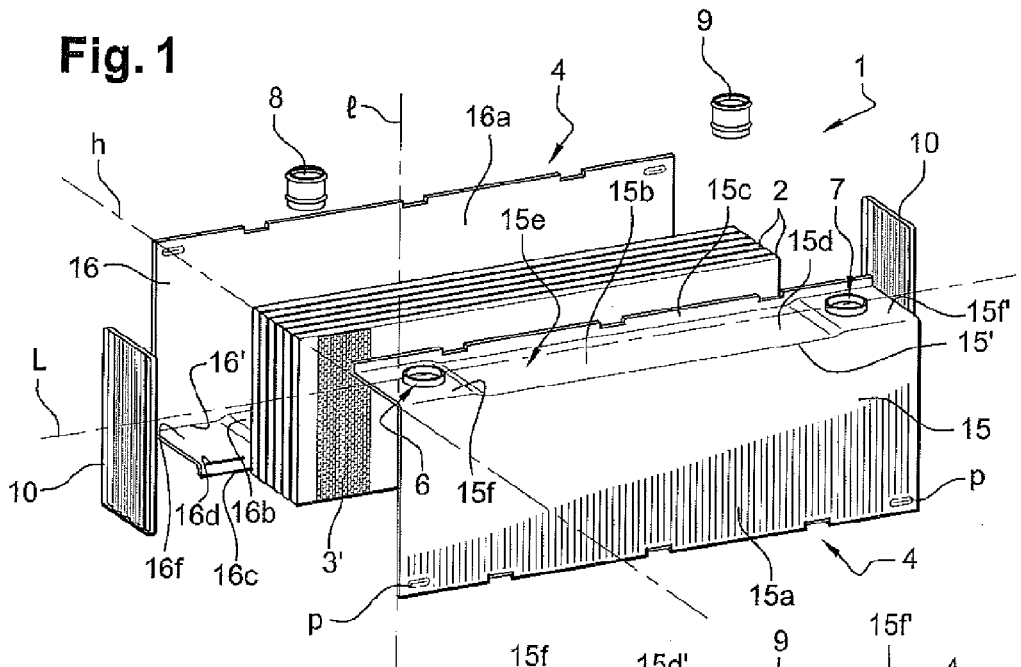
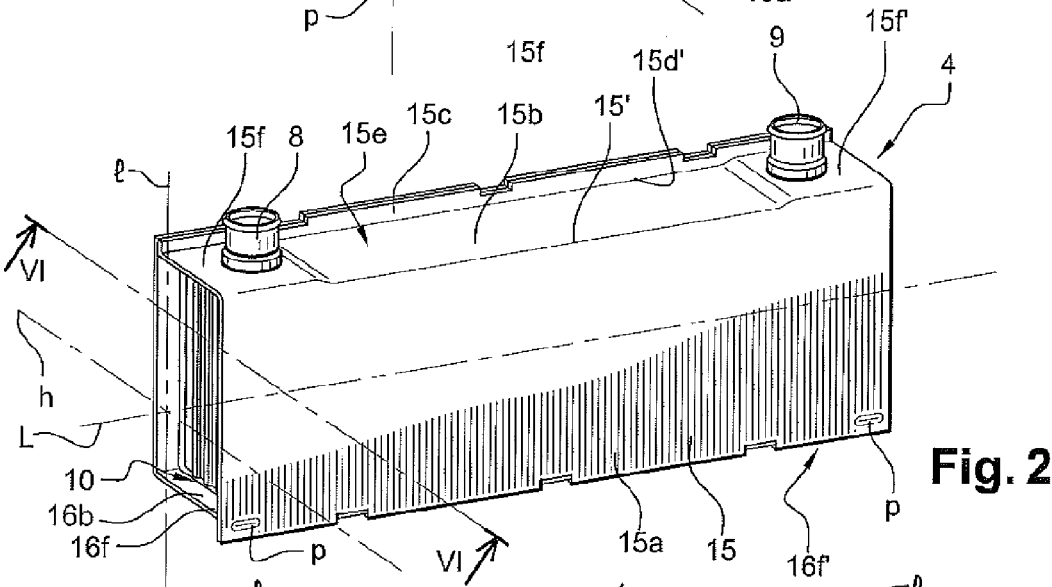
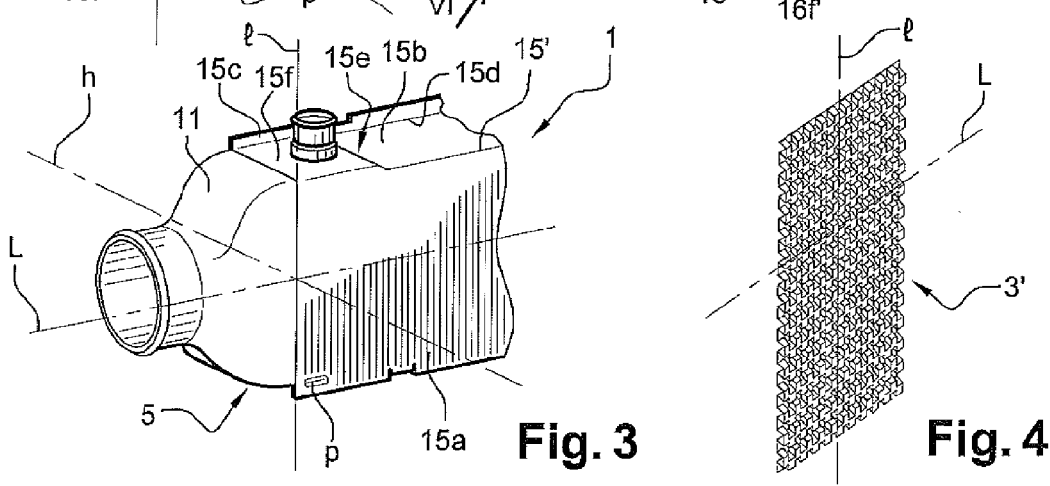
Fig. 1
Fig. 2
Fig. 3
Fig. 4

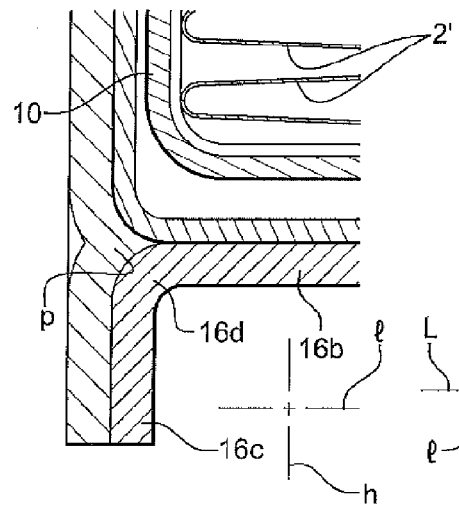
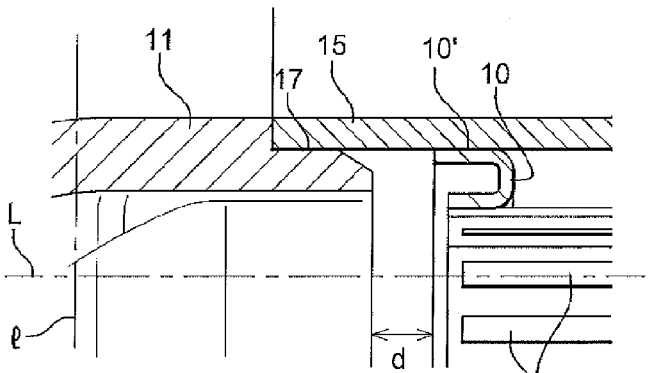
Fig. 9   Fig. 10
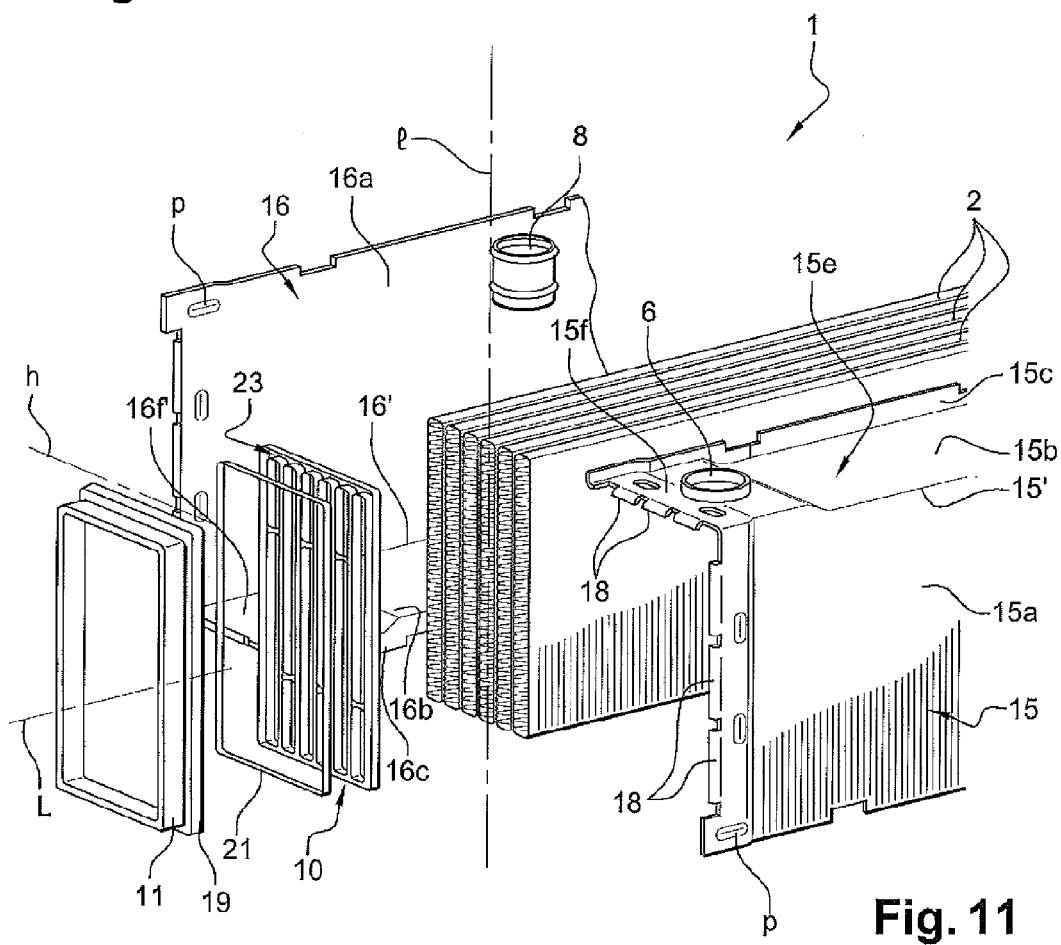
Fig. 11

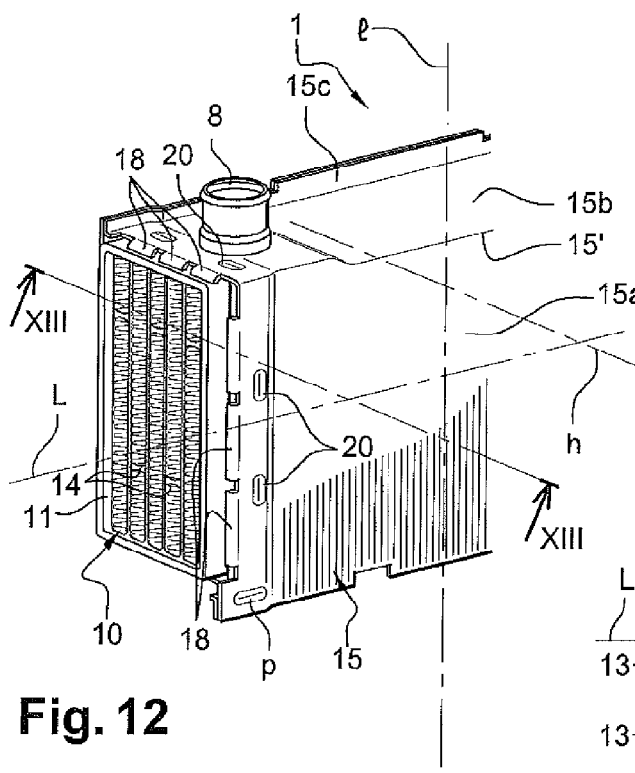
Fig. 12
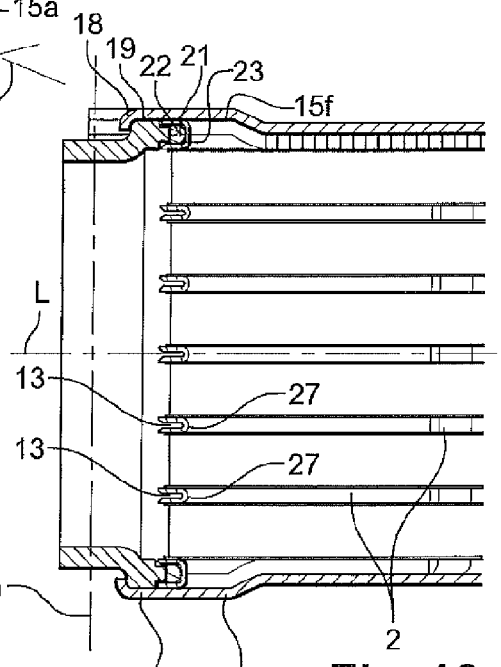
Fig. 13
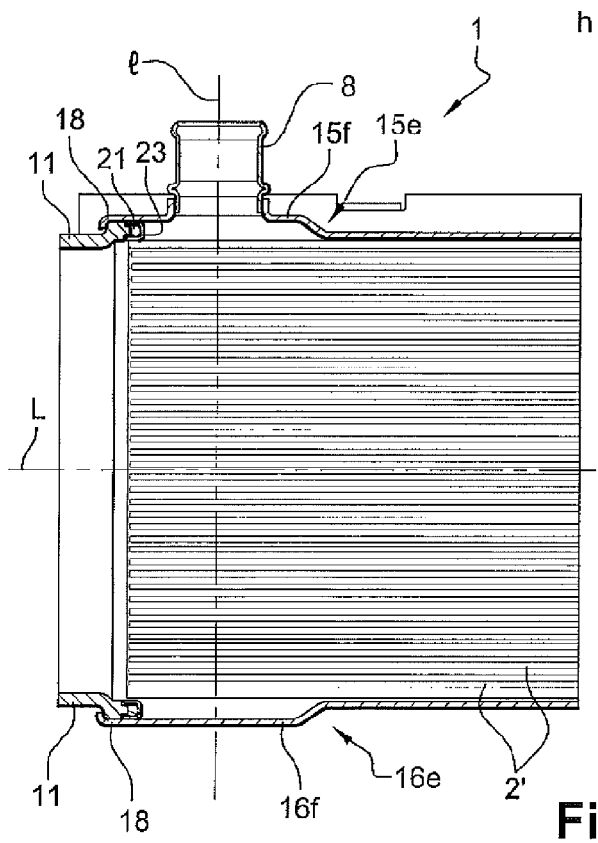
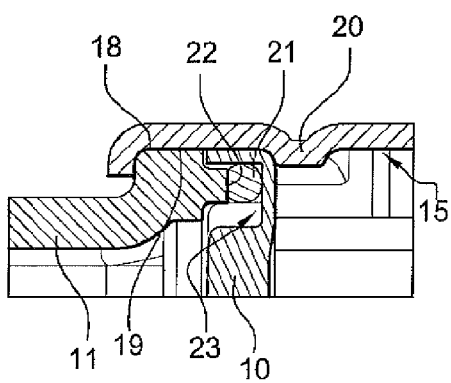
Fig. 15
Fig. 14

HEAT EXCHANGER AND CASING FOR THE HEAT EXCHANGER

RELATED APPLICATIONS

This application claims priority to and all the advantages of International Patent Application No. PCT/EP2009/057739, filed on Jun. 22, 2009, which claims priority to French Patent Application No. FR 08/03603, filed on Jun. 26, 2008.

The invention relates to a heat exchanger.

A heat exchanger, for example a heat exchanger used in the motor industry, or more specifically in an internal combustion engine of a motor vehicle, comprises heat exchange and fluid flow components in which fluids circulate and exchange heat between them. The heat exchange components may, for example, include tubes, plates, fins, flow disrupters, and the like. Numerous structural configurations can be envisaged. For example, the exchanger can comprise a bundle of tubes arranged parallel to each other in one or more arrays which are parallel to each other, these tubes being designed to convey a first fluid, while a second fluid flows between the tubes and exchanges heat with the first fluid. Numerous combinations of fluids can be envisaged, and the fluids can be liquids and/or gas.

A known heat exchanger has a casing to accommodate the tubes, this casing having a plurality of walls forming the volume in which the tubes are accommodated. It is generally open at both ends, to enable the tubes to be connected to fluid distribution housings, namely an inlet distribution housing and an outlet distribution housing. The first fluid flows in the tubes from the inlet distribution housing towards the outlet distribution housing. The second fluid flows around the tubes from an inlet tube to an outlet tube, and exchanges heat with the first fluid.

Each fluid distribution housing generally comprises a header plate for holding the tubes and a fluid manifold mounted on the header plate to form the volume of the casing. The tubes pass through holes made in the header plate and open into the fluid manifold.

The header plates are generally fixed to the casing and the manifolds are fixed to the header plates, by crimping for example. For this purpose, each header plate has means for crimping on to one edge of the fluid manifold with which it is associated, these means increasing the external volume of the exchanger and giving rise to problems of large overall dimensions.

In view of this, the object of the invention is to provide a compact exchanger.

For this purpose, the invention relates to a heat exchanger having exchange and fluid flow components, at least one fluid manifold into which the exchange components open, at least one header plate for holding the exchange components and a casing for accommodating the exchange components, characterized in that the fluid manifold is held directly by the casing.

Because of the invention, according to which the manifold is held directly by the casing, the header plate no longer needs to include means for holding the manifold. Consequently the overall dimensions (the overall volume) of the exchanger is limited to the outside dimensions of the casing; the exchanger is therefore more compact.

In one embodiment, the header plate is also held by the casing.

In one embodiment, the manifold and the casing are welded or brazed.

In one embodiment, the manifold includes an end portion having a shape complementary to the shape of one end of the casing to which it is welded or brazed, to provide continuity of the outer surface of the exchanger.

In one embodiment, the manifold and the casing are crimped.

In one embodiment, the casing includes at least one lug for crimping on to the manifold, designed to interact with a surface of the manifold in order to hold the latter.

In one embodiment, in which the header plate is also held by the casing, the casing includes at least one stop and the manifold and the header plate are held between the crimping lug and the stop.

In one embodiment, the exchanger includes sealing means between the fluid manifold and the header plate, for example a seal ring or a brazed joint between the manifold and the header plate.

The invention also relates to a casing for accommodating exchange and fluid flow components in a heat exchanger, the exchange components being designed to be held by a header plate and to open into a fluid manifold, characterized in that the casing includes means designed to hold the fluid manifold directly.

In one embodiment, the casing includes at least one crimping lug.

In one embodiment, the casing includes a stop designed to hold the manifold and the header plate between the crimping lug and the stop.

In a specific embodiment of the exchanger, in which the exchange and fluid flow components open into a fluid manifold through holes in a header plate for holding the exchange component, the holes are provided with stiffening means.

Because of the stiffening means, the header plate has high mechanical strength and the dimensions of the holes are guaranteed.

It should be noted that a slight misuse of terminology appears in the description of this specific embodiment of the invention, in that the holes are said to be provided with means of stiffening. In fact a hole is an opening bordered by a wall. It should therefore be understood that it is the header plate that has the stiffening means with which the holes are provided; the means in question are actually means of stiffening the walls which form (or border) the holes.

In one embodiment, the exchange components include tubes.

In one embodiment, the tubes are butted on to the header plate in line with the holes.

In one embodiment, the stiffening means comprise at least one strap extending into a hole and also forming a stop for a tube associated with the hole.

In one embodiment, each hole has at least one stiffening strap which also acts as a stop for a tube associated with the hole.

In one embodiment, said stiffening and stop strap forms an integral part of the header plate, and, more specifically, is made in one piece with the header plate.

In one embodiment, the stiffening means comprise at least one flange bordering a hole.

In one embodiment, each hole is bordered by at least one flange which also serves to support an end of a tube associated with the hole.

In one embodiment, the end of the tube is brazed to the flange.

In one embodiment, the header is formed from a plate, preferably a metal plate, and the flange is formed by bending the plate.

In one embodiment, at least one stiffening strap which acts as a stop for a tube extends between the opposite flanges located on either side of the hole.

In one embodiment, each hole has a first dimension of more than 50 mm and the holes are separated from each other, in a second dimension substantially perpendicular to the first dimension, by a distance smaller than or equal to 3 mm.

In another specific embodiment of the exchanger, the casing is formed by a plurality of walls joined together and includes two L-shaped walls.

As a result of this specific embodiment of the invention, the casing is formed from two L-shaped walls which can be formed with the same tools; two L-shaped walls may also be nested. This facilitates the storage of the walls intended to form casings. It is also simpler to place the exchange components in two L-shaped walls than to slide them into a U-shaped wall.

In one embodiment, the two walls have the same external shape.

This makes the casing even easier to manufacture and store.

In one embodiment, each wall has two panels perpendicular to each other, one panel of each wall having a raised edge for fixing to a panel of the other wall.

In one embodiment, each wall has two panels and one of the panels has an indentation designed to come into contact with the tubes for the flow of a first fluid which are assembled in parallel, thus forming channels for the flow of a second fluid between said tubes.

The forming of this indentation is facilitated by the L-shape of the walls, allowing easy access to both sides of each panel for forming the indentation (which is not the case with a U-shaped wall).

In one embodiment, the panel having the indentation also has at least one hole for connection to a circuit for the flow of the second fluid, and said hole is positioned on a part of the panel separate from the indentation to provide a better distribution of the second fluid in its flow channels.

In one embodiment, each wall has at least one sealing portion designed to fill a gap in the area of its fixing to the other wall. More specifically, the gap is a gap created between these walls and a header plate for holding the exchange components in position.

In one embodiment, the walls are brazed to each other, and the exchange components are preferably brazed to the walls.

In one embodiment, the walls have means for holding the exchange components during brazing.

In another specific embodiment of the exchanger, the casing proposed by the invention is formed by a plurality of walls joined together and includes two L-shaped walls.

This casing has the advantages of the casing of the exchanger described above.

This casing can have the characteristics of the casing of the exchanger described above.

The invention is applicable to any heat exchanger. It is particularly suitable for application to a heat exchanger for cooling a gas with water, and more specifically to a cooler of what are known as the "recirculated" exhaust gases of an internal combustion engine of a motor vehicle or to a supercharging air cooler for an engine of this kind.

The invention will be more clearly understood with the aid of the following description of the preferred embodiment of the exchanger according to the invention, with reference to the attached sheets of drawing, in which:

FIG. 1 shows an exploded perspective view of a first embodiment of the exchanger according to the invention;

FIG. 2 shows a perspective view of the exchanger of FIG. 1 with its various components assembled to each other;

FIG. 3 shows a perspective view of one end of the exchanger of FIG. 2 with a fluid distribution housing fixed to its casing;

FIG. 4 shows a perspective view of a part of the water flow disrupter of the exchanger of FIG. 2;

FIG. 9 is an enlarged view of area A of FIG. 7;

FIG. 10 is a sectional profile view of the area of fixing of the casing and of the distribution housing of the exchanger of FIG. 3;

FIG. 11 shows an exploded perspective view of a second embodiment of the exchanger according to the invention;

FIG. 12 shows a perspective view of the exchanger of FIG. 11 with its various components assembled to each other;

FIG. 13 shows a sectional view of one end of the exchanger of FIG. 12, in the plane XIII-XIII of FIG. 12;

FIG. 14 is a sectional profile view of one end of the exchanger of FIG. 12;

FIG. 15 shows a sectional view in a plane parallel to the section plane of FIG. 14, at the position of a stop of the casing of the exchanger;

Figure 5:
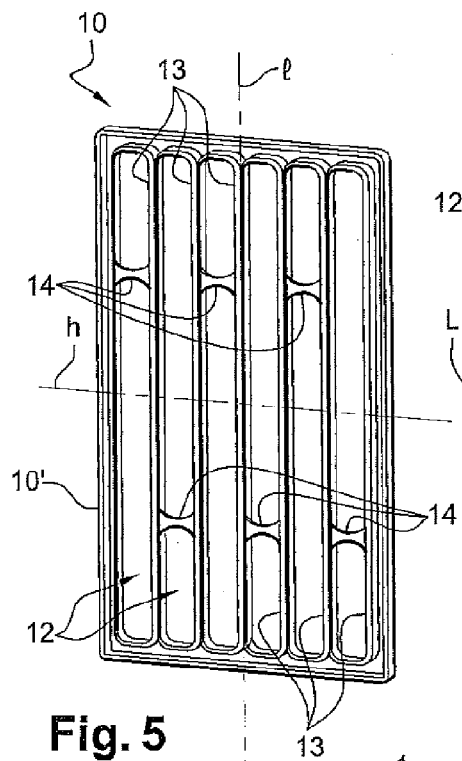
FIG. 5 shows a perspective view of one of the header plates of the exchanger of FIG. 2.

With reference to the drawings and to FIG. 1 in particular, a heat exchanger 1 according to a first embodiment has heat exchange components 2, 2', 3, 3', a casing 4 to accommodate these components 2, 2', 3, 3', an air inlet distribution housing 5 and an air outlet distribution housing (not shown). The casing 4 has holes 6 and 7 for connection to water flow tubes 8 and 9, in the present case an inlet tube 9 and an outlet tube 8, connected to a water circuit in which the exchanger 1 is fitted. In the described embodiment, the various components of the exchanger 1 are brazed to each other; these exchangers with brazed components are well known to persons skilled in the art.

The exchanger 1 which is described is what is known as an air/water exchanger, that is to say an exchanger in which the fluids which exchange heat are air and water. It is, for example, a cooler using water to cool what are known as the recirculated exhaust gases of an internal combustion engine of a motor vehicle, or a supercharging air cooler of such an engine; the water is preferably water drawn from what is known as the low temperature cooling circuit of said engine, typically a glycol/water solution.

With reference to FIG. 2, the exchanger 1 has a parallelepipedal shape overall. According to convention, and in order to simplify the description, the following directions are defined: the direction L of the length of the exchanger 1, which is its greatest dimension, and the direction in which the fluids flow; the direction l of the width of the exchanger 1; and the direction h of its height (or thickness). In the following text, the directions of these dimensions will not be distinguished from their values; in other words, L, l and h may denote either the length, width and height of the exchanger 1 or the direction of the length, the direction of the width and the direction of the height of the exchanger 1. Furthermore, the concepts of external (or outer) and internal (or inner) which may be used in the description refer to relative positions of components with respect to the outside or inside of the exchanger 1.

The exchange components include air flow tubes 2 in which fins 2' for disrupting this air flow are fitted. The tubes 2 delimit between them water flow channels 3 in which disrupters 3' of the water flow are fitted.

More precisely, the air flow tubes 2 have a flattened shape; their larger dimension (which is the overall direction of the flow of air in the tubes) is parallel to the direction of the length L of the exchanger 1, and their transverse section with respect to this length L is rectangular; the rectangle formed by the section of each tube 2 has one dimension parallel to the width l of the exchanger 1 and one dimension parallel to the height h of the exchanger 1. Each tube 2 has a length substantially equal to the length L of the exchanger 1 and a width substantially equal to the width l of the exchanger 1; its dimension parallel to the height h of the exchanger 1 is less than the height of the exchanger 1, since the tubes 2 are stacked in this dimension; this dimension is relatively small in the present case, giving the tubes 2 their flattened shape, and is in fact identical to their thickness. For example, the thickness of the tubes 2 can be approximately 7 or 8 mm for each tube 2, the width l of the tubes 2 being equal to approximately 100 mm. On the other hand, the inter-tube spaces (that is to say the water flow channels 3) can for example have a dimension (parallel to the height h of the exchanger 1) of less than 3 mm, being for example substantially equal to 2 mm.

Figure 7:
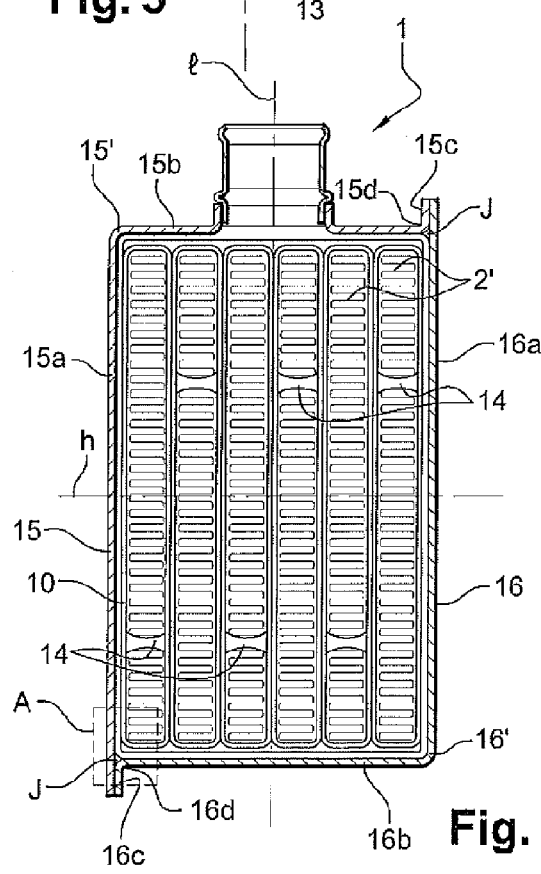
FIG. 7 is an end-on view from the right of the exchanger of FIG. 2 along its longitudinal axis.

With reference to FIG. 7, the fins 2' are mounted in the inner volume of the tubes 2. The function of these fins 2' is to disrupt the flow of air in the tubes 2 to facilitate heat exchanges between the air and water through the walls of the tubes 2. These fins 2' are well known to persons skilled in the art and it is unnecessary to describe them in detail; in this case, they have a corrugated shape and their cross section is of serpentine shape between the walls of each tube 2 when viewed end-on in the axis of the length L of the exchanger 1.

The tubes 2 are assembled parallel to each other, the assembly of tubes 2 forming a stack in the direction of the height h of the exchanger 1 (this is also referred to as a tube bundle); the dimension of the bundle 1 parallel to the height h of the exchanger 1 is substantially equal to the height h of the exchanger 1. Thus the tubes 2 are assembled on to each other so as to be parallel to each other, and allow air to circulate within them, in the overall direction of the length L of the exchanger. The exchanger 1 described here has a bundle of six tubes 2, but clearly it could have a smaller or greater number of tubes; it should be noted that, in some cases, the height h of the exchanger 1 can be greater than its width l, if the number of tubes 2 is sufficiently large.

Figure 6:
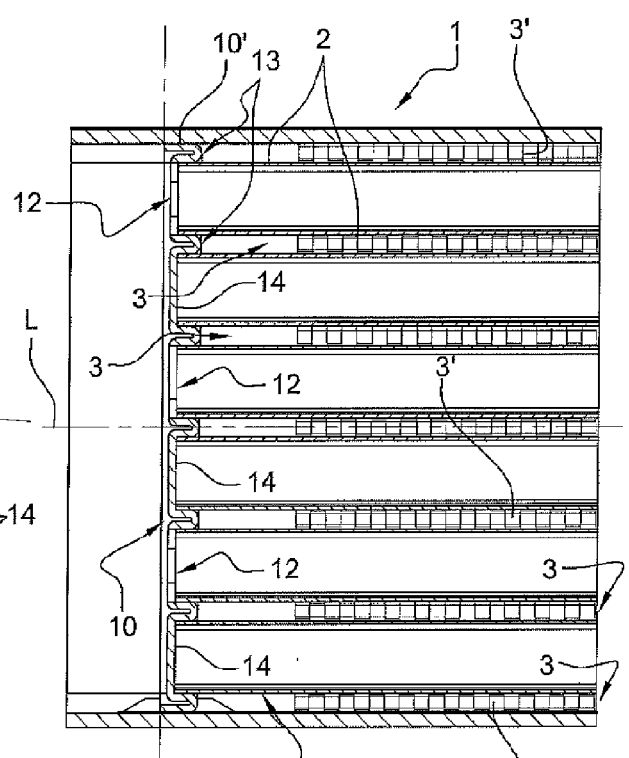
FIG. 6 shows a sectional view of one end of the exchanger of FIG. 2, in the plane VI-VI of FIG. 2.

The tubes 2 form water flow channels 3 between them, and disrupters 3' of the flow of water between the tubes 2 are fixed in these channels, by brazing in the present case. One part of a disrupter 3' is shown in FIG. 4. Similarly, only one part of the disrupter 3' is shown in FIG. 1; in this case, the disrupters 3' take the form of plates extending substantially over the whole lateral surface of the tubes 2 (the term "lateral surface" means the surface of the tubes 2 defined by the dimensions parallel to the length L and the width l of the exchanger 1), except in the proximity of the ends (in the direction of the length L of the exchanger 1) of the tubes 2, as detailed below. Additionally, each disrupter 3' fills all the space, in the direction parallel to the height h of the exchanger 1, of the water flow channel 3 in which it is fitted, since it is brazed on each side to the surfaces of the tubes 2 delimiting said channel 3. It should be noted that the disrupters 3' are fitted between all the tubes 2 and also between the end tubes 2 and the walls of the casing 4, as shown in FIG. 6.

The shape of the disrupters 3' is such that turbulence is created in the water flow passing through them. In this case, the disrupters 3' take the form of a corrugated wall, the corrugations being formed at right angles and in both dimensions (L, l) of the plate forming the disrupter 3'. In other words, the disrupters 3' have corrugated wall components both in the direction parallel to the width l of the exchanger 1 and in the direction parallel to the length L of the exchanger 1, the rows of components being offset from each other. Recesses are also provided at periodic intervals in the wall components; the patterns defining the shape of the disrupters 3' are periodic. It is unnecessary to describe the structure of the disrupters 3' in greater detail, since they are well known to persons skilled in the art and their structure is clearly visible in FIG. 4. Water circulates between the air circulation tubes 2 and its flow is disrupted by the disrupters 3', thus facilitating the exchange of heat with the air through the walls of the tubes 2.

As mentioned above, the exchanger 1 has an air distribution housing at each of its ends (in the dimension of its length L). On the left-hand side (in the drawings), this housing is an air inlet distribution housing 5, while on the right-hand side it is an air outlet distribution housing (not shown). The ends of the air circulation tubes 2 are connected to the air distribution housings 5, the inner volume of the tubes 2 thus being in fluid communication with the inner volume of the distribution housings 5; in other words, the tubes 2 open into the housings 5. The distribution housings 5 are connected to tubes of an air circuit in which the exchanger 1 is fitted. The air is introduced into the tubes 2 through the inlet distribution housing 5 and is collected at the outlet from the tubes 2 by the outlet distribution housing.

The structure of the inlet distribution housing 5 will now be described. The position and shape of its components are described, in order to simplify the description, with respect to the fitted position of the housing 5 on the exchanger 1. The outlet distribution housing (not shown) is in this case similar to the inlet housing 5 and is fitted in a symmetrical way; clearly, the housings could be different from each other in another embodiment.

The inlet distribution housing 5 has a header plate 10 which has the function of holding the tubes 2 in position, guiding the air flow between the inner volume of the distribution housing 5 and the tubes 2, and blocking the flow of water towards the inner volume of the housing 5, while preventing the flows of air and water from combining with each other; the header plate 10 is generally known as a "header" 10 to persons skilled in the art. It should be noted that in this case the header 10 of the outlet distribution housing is identical to the header 10 of the inlet distribution housing and is indicated by the same reference numeral 10 in the drawings. The housing 5 also has an air manifold 11, or cover 11, or manifold 11, which forms the volume of the housing 5 in conjunction with the header 10. More precisely, with reference to FIG. 10, the volume of the housing 5 is in this case formed by the manifold 11, the header 10 and a portion of casing 4. This is because, in the embodiment shown in FIGS. 1 to 10, the header 10 is fixed to the casing 4 at a distance d from the end of the manifold 11 which is also fixed to the casing 4, as detailed below; consequently, the volume of the housing 5 is partially formed by the part of the casing 4 separating the header 10 from the manifold 11.

With reference to FIG. 5, the header 10 takes the form of a plate fitted transversely with respect to the length L of the exchanger 1 to receive the ends of the tubes 2. The header 10 is pierced by a plurality of holes 12, each hole 12 being associated with a tube 2. Each hole 12 has a shape corresponding to the cross section of a tube 2. Each hole 12 is bordered by walls 13 or flanges 13 or rims 13 for stiffening the header 10. These flanges 13 ensure that the dimensions of the holes 12 are constant and defined; this is because the flanges 13 form stiffened walls defining (bordering) the holes 12, that is to say they form means of stiffening these holes 12.

The flanges 13 also perform a function of supporting the ends of the tubes 2 which are associated with them. Overall, these flanges 13 extend perpendicularly to the overall plane of the plate forming the header 10, and are therefore parallel to the direction of the length L of the exchanger 1, the projecting end 27 of each flange 13 being directed towards the inside of the exchanger 1; in other words, the flanges 13 for stiffening and for supporting the tubes 2 extend from the header 10 around the tubes 2 whose ends they enclose. In FIG. 5, the header 10 is viewed from the rear and its flanges 13 extend forwards. The function of the flanges 13 is to hold the tubes 2 in position. For this purpose, the ends of the tubes 2 are slid into these flanges 13, which form sliding paths to enclose them; each flange 13 forms a contact surface with the surface of the end of the tube 2 which is associated with it, enabling them to be brazed to each other. The tubes 2 are fixed in position once they have been brazed in this way to the flanges 13 bordering the holes 12 of the header 10.

Each hole 12 of the header 10 is also provided with a stiffening strip 14 or strap 14 or link 14. The straps 14 extend at the bases of the flanges 13 for stiffening and for supporting the tubes 2, that is to say on the side opposite their projecting ends 27; thus the straps 14 extend from the outer side of the exchanger 1. In the described embodiment, the straps 14 are formed in the holes 12 of the header 10 about a quarter of the way along its dimension parallel to the width l of the exchanger 1, alternating from one hole 12 to the next between one and the other side of the header 10 in this dimension. Because of the alternation of the straps 14 on either side of the header 10, the stiffening function which they provide is distributed and uniform over the header 10.

One stiffening function provided by the straps 14 is that they fix the spacing of the flanges 13 bordering the holes 12 and thus fix the dimensions of the holes 12, that is to say they ensure that all the holes 12 have the same dimension in the direction parallel to the height h of the exchanger 1, regardless of the considerable projection of the flanges 13. The term "projection" here signifies the ratio of the largest dimension of each flange 13 (its dimension parallel to the width l of the exchanger 1) to one of the smaller dimensions of the flange 13 (either its dimension parallel to the thickness h of the exchanger 1, or its dimension parallel to the length L of the exchanger 1).

Thus the flanges 13 and the straps 14 complement each other in stiffening the header 10 and thus fix the dimensions of its holes 12 and ensure their stability. The combination of these components 13 and 14 is reinforced by the fact that the straps 14 are integral with the flanges 13, since they are made in one piece with them and extend from their bases.

Another function of the straps 14 is to form a stop for the ends of the tubes 2 which are slid into the flanges 13 (the stop is therefore an axial stop on the longitudinal axis L of the exchanger 1). Thus the tubes 2 are butted against the header 10 in line with the holes 12, meaning that they do not pass through the holes 12 but are arrested at the level of (and perpendicularly to) the holes 12 by the straps 14. FIG. 6 shows a sectional view of the ends of the tubes 2 slid into the flanges 13, bearing on the straps 14 and brazed to the flanges 13; this section is taken in the plane VI-VI of FIG. 2, which is a plane cutting an area of the header 10 at the position of the straps 14.

Because of the straps 14, each tube 2 is perfectly positioned in line with the hole 12 with which it is associated. Since the dimensions of the holes 12 are permanently fixed by the straps 14, there are no significant fluctuations, along the periphery of the end of a tube 2, in the gap between the outer surface of this end and the inner surface of the flange 13 which encloses it; said surfaces (of the flange 13 and the end of the tube 2) can thus be brazed to each other with a brazed joint which is regular and therefore of high quality. It is also possible to braze the ends of the tubes 2 to the straps 14; in this way the straps will increase the available brazing surface and thus improve the mechanical strength of the exchanger 1.

Clearly, other distributions or arrangements can be envisaged for the straps 14. For example, the straps 14 can all extend in the centers of the holes 12 of the header 10; in this case, they are all aligned. In another example, each hole 12 can have a plurality of stiffening straps 14. Other stiffening means, also acting as stops for the tubes 2, can also be provided. In all cases, it is to be understood that the stiffening means, which in the present case are the straps 14, are indeed means of stiffening a hole 12 and are not means of separating two holes; each hole 12, with its stiffening means 14, is associated with a single tube 2, and therefore the stiffening means (the straps 14) should not be confused with means for separating two holes 12. Additionally, if the header 10 has a plurality of holes aligned in its direction parallel to the width of the exchanger 1, these holes will be separated by means which are distinct from the straps 14; in particular, and preferably, part of the flange for stiffening and for supporting the tubes may extend between the successive holes in this direction l.

FIGS. 6 and 7 show how the header 10 is positioned with respect to the tubes 2, and thus how it performs its function not only of holding the tubes 2 in position but also of guiding the air between the volume of the manifold 11 and the tubes 2 while blocking the flow of water towards the manifold 11. In the embodiments described here, the header 10 is contained in the casing 4; in other words, the casing 4 is a casing 4 for accommodating the exchange components 2, 2', 3, 3' and the headers 10.

The tubes 2 are butted on to the header 10 in line with the holes 12, with their end walls brazed to the flanges 13; the ends of the tubes 2 are thus separated from each other by these flanges 13; the spaces formed by the separation of the successive tubes 2 form water flow channels 3 in which the disrupters 3' are fitted. Since the flanges 13 are brazed to the ends of the tubes 2 and fill in a transverse way (with respect to the direction of the length L of the exchanger 1) all the space between the tubes, these flanges 13 prevent the water from flowing into the volume of the manifold 11; these flanges 13 also prevent the water from flowing into the tubes 2.

Figure 16:
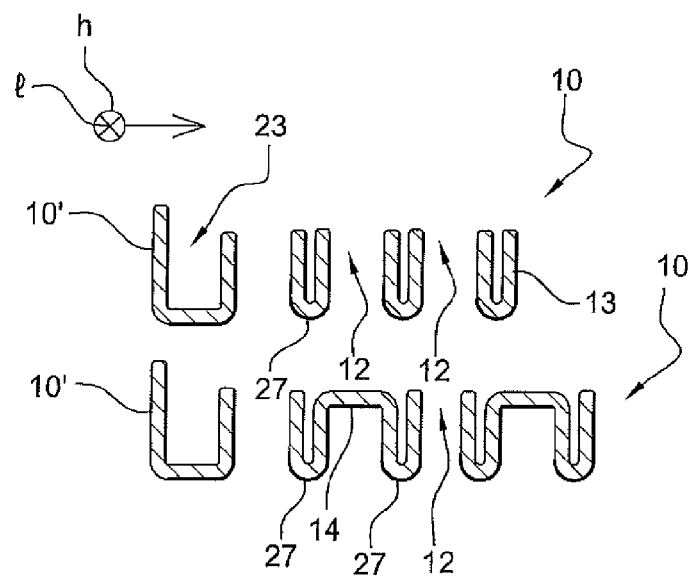
FIG. 16 is a schematic representation of two separate sectional views of the header of FIG. 5, one in a plane which does not cut through any strap (drawn from above) and the other in a plane which cuts through a strap (drawn from below)

The structure of the header 10 of the exchanger will be described again, to make it more understandable, with reference to FIG. 16. This drawing shows sectional illustrations of the header 10 in a plane which is transverse with respect to the width l of the exchanger 1 when the header 10 is fitted on the exchanger. In other words, the section is taken in a plane cutting the holes 12 of the header 10 transversely with respect to their largest dimension.

The header 10 is formed from a flat metal plate. This plate is stamped to form the flanges 13 and is punched to form the holes 12 bordered by the flanges 13. The flanges 13 therefore take the shape of double walls parallel to the largest dimension l of the header 10, these double walls being joined at their free ends 27. The straps 14 are formed during the punching operation by omitting the punching in the areas corresponding to the straps 14. The straps 14 thus form an integral part of the header 10, and, more precisely, are made in one piece with this header 10 and notably with its flanges 13.

The peripheral edge of the header 10 is raised to form the peripheral channel 23 of the header 10 (this channel 23 is thus formed between the peripheral edge and the outer walls of the flanges 13). In the first embodiment of the exchanger 1 described with reference to FIGS. 1 to 10, the channel 23 is not used as such but the raising of the external edge of the header 10 provides a surface 10' perpendicular to the plane of the header 10, which can be brazed to the internal surfaces of the casing 4. In the second embodiment of the exchanger 1 described with reference to FIGS. 11 to 15, the peripheral channel 23 can accommodate the seal ring 21.

Since the flanges 13 are bent about their largest axis, the flanges 13 do not interfere with the formation of the holes 12 by the punching of the plate. It should also be noted that, in an embodiment which is not shown, the bent flanges 13 can be the only means of stiffening, without the need to provide straps 14.

In each hole 12, the strap 14 extends between opposite flanges 13 on either side of the hole 12, thus maintaining and ensuring the spacing between these flanges 13. The straps 14 form an integral part of the header 10, and, more particularly, the straps are made in one piece with the header 10, thereby increasing the stiffness of the assembly even more.

Because of the stiffening means (the bent flanges 13 and/or straps 14), a header 10 can be formed with elongate holes 12, separated by narrow walls 13 (corresponding to a short inter-tube distance); thus the flanges 13 have a large projection. It is therefore possible to associate the holes 12 with tubes 2 having a flattened and elongate cross section. This makes it possible to have a large air passage section with a small thickness h of the tubes 2, and therefore to manufacture an exchanger 1 with a good air flow rate in spite of a small overall dimension in the direction of its thickness h; this is particularly advantageous when the overall dimensions of the engine in which the exchanger 1 is to be fitted set a limit on the thickness h of the exchanger 1, which must therefore be relatively flat.

By way of example, if the plate used to form the header 10 has a thickness of approximately 1 mm, a header 10 can be formed with holes 12 measuring approximately 100 mm by 7 or 8 mm, with an inter-tube spacing of 2 to 3 mm. The overall dimension (parallel to the direction of the length L of the exchanger 1) of the flange 13 can be substantially equal to 4 mm; thus, if the thickness of the straps 14 (1 mm) is subtracted, the flanges 13 have a useful surface of approximately 3 mm for supporting the ends of the tubes 2 and for brazing to the tubes.

The exchange components, namely the tubes 2 with their fins 2' and the channels 3 with their disrupters 3', are contained in an accommodating casing 4. The casing 4 has a first wall 15 and a second wall, these walls 15 and 16 being L-shaped; in other words, each wall 15, 16 has a transverse section (with respect to the direction of the length L of the exchanger 1) in the shape of an L. Each wall 15, 16 is L-shaped by bending about a corner 15', 16', to form two panels (15a, 15b), (16a, 16b) which are perpendicular to each other.

More precisely, in this case each wall 15, 16 has a large panel 15a, 16a and a small panel 15b, 16b. The large panel 15a, 16a takes the form of a rectangular plate having dimensions substantially equal to the length L of the exchanger 1 and to its width l, while the small panel 15b, 16b takes the form of a rectangular plate having dimensions substantially equal to the length L of the exchanger 1 and to its height h. The concepts of large and small panels are introduced here to enable each of the panels (15a, 15b), (16a, 16b) of each wall 15, 16 to be separately identified; it happens to be the case, in the described embodiment, that, because of the relative dimensions of the height h and the width l of the exchanger 1, one panel (15a, 15b) is larger than the other (16a, 16b), but clearly if the proportions between these dimensions were reversed, the concepts of large and small panels would also be reversed; briefly, it should be understood that the concepts of large and small are not a constraint or a limitation on the exchanger 1, but that it is simpler to identify them in this way because this is the case in the present embodiment.

The tubes for the inlet 9 and outlet 8 of water into and from the exchanger 1 are connected to the same face of the exchanger 1 in this case. Thus the holes 6 and 7 for connection to these tubes 8 and 9 are pierced in the same panel of only one of the two walls 15 and 16, in this case in the small panel 15b of the first wall 15.

The two walls 15 and 16 are identical except for the holes 6 and 7 pierced in the small panel 15b of the first wall 15; in particular, their external shapes are therefore identical. Consequently, their manufacture is simplified because it can be unified, and their storage is facilitated because the external shape of the walls 15 and 16 allows them to be nested together. Thus it is possible for the set of L-shaped walls to be manufactured with a single tool, only half of these walls being pierced with holes thereafter. The walls can then be stored easily and in an optimal way (as regards their overall dimensions), since they are simply nested and stacked with each other.

To form the casing 4 in its final form, the walls 15 and 16 are fixed to each other around the exchange components 2, 2', 3, 3' and the headers 10; in this case, they are brazed. For this purpose, each wall 15, 16 has, at the free end of its small panel 15b, 16b, a raised edge 15c, 16c, which is an edge 15c, 16c for fixing to the large panel 16a, 15a of the other wall 16, 15. This raised edge 15c, 16c extends perpendicularly to the small panel 15b, 16b, from a bending corner 15d, 16d by which it is connected to the small panel; this bending corner 15d, 16d is parallel to the bending corner 15', 16' between the large and small panels (15a, 15b), (16a, 16b).

The orientation of the raised edges 15c and 16c, which is outward and perpendicular to the small sides 15b and 16b in this case, enables a good joint to be made between the casing 4 and the headers 10. The term "outward" signifies that the raised edge or edges 15c, 16c are not in contact with the tubes 2 in this case. In the embodiment illustrated here, only the bending corner or corners is or are in contact with the exchange components. In other words, the raised edge 15c or 16c extends outside the volume defined by the exchange components 2, 2', 3, 3' and/or the header 10.

The L-shaped walls 15, 16 are placed in position around the heat exchange components 2, 2', 3, 3' and the headers 10 in reversed positions, in other words head to tail; in this position, the raised edge 15c, 16c of the small panel 15b, 16b of each wall 15, 16 bears on the free end of the large panel 16a, 15a of the other wall 16, 15. The different components of the walls 15, 16 are configured in such a way that the free end, parallel to the bending corner 15d, 16d, of each raised edge 15c, 16c extends in line with the free end of the large panel 16a, 15a on which it bears. In this position, the walls 15, 16 of the casing 4 are brazed together, by brazing the surfaces of their panels (15a, 15b), (16a, 16b) which are in contact with each other (namely the raised edges 15c, 16c and the ends of the large panels 16a, 15a placed against them). When the walls 15, 16 have been fixed, the panels (15a, 15b), (16a, 16b) of the L-shaped walls 15, 16 form the four lateral faces of the exchanger 1 (the term "lateral" is used with respect to the longitudinal direction L of the exchanger).

It should be noted that, in the described embodiment, the header 10 is fixed to the casing 4 by brazing. More precisely, the outer surface 10' which extends along its periphery is brazed to the internal surfaces of the panels (15a, 15b), (16a, 16b) of the walls 15, 16.

The L-shape of the walls 15, 16 facilitates the positioning of the casing 4 around the exchange components 2, 2', 3, 3'. This is because it is difficult to house a tube bundle in a U-shaped wall whose dimensions are adapted to the outer shape of the bundle; in particular, the bundle has to be held to keep it in position, while the bundle is slid between the walls forming the branches of the U-shape of the wall, this operation being difficult because the clearance between the parts must not be too great. However, it is very simple to position a first wall 15, 16 in contact with two of the faces of the tube bundle 2, then position the second wall 16, 15, and finally braze them. In particular, when the wall 15, 16 is positioned in this way, there is no need to hold the tubes 2 and disrupters 3' in position very securely, since they will be positioned simply by the action of the second wall 16, 15 when this is put in place. Furthermore, there is no problem with the clearance, because the bundle is not slid between the walls; instead, the walls 15, 16 are placed against the bundle.

Because of the L-shape of the walls 15, 16 of the casing 4, the panels 15a, 16a of the walls 15, 16 parallel to the lateral faces of the tubes 2 do not project beyond the volume of the exchanger 1; in other words, the large panels 15a, 16a are flat, and no component projects beyond them in the direction perpendicular to them. This characteristic is due to the fact that, owing to the L-shape of the walls 15, 16, fixing takes place along surfaces parallel to the planes of these large panels 15a, 16a (the contact surfaces between the raised edges 15c, 16c of the small panels 15b, 16b and the large panels 15a, 16a). During the brazing of the exchanger 1, the brazing jig, that is to say the device enabling this brazing to be carried out, includes tools such as presses which bear on the faces of the casing 4 parallel to the lateral faces of the tubes 2 (in this case, the large panels 15a, 16a), because the surfaces on which the tubes 2 are brazed to the disrupters 3' are parallel to these faces and it is preferable to apply the forces perpendicularly to these surfaces. Since the large panels 15a, 16a are flat, their contact with the tools is simplified, as the tools can be made to contact the whole surface of the panels 15a, 16a without any constraints in respect of the overall dimensions.

The small panel 15a, 16a of each wall 15, 16 has an indentation 15e, 16e or recess 15e, 16e in its central part. This indentation 15e, 16e is formed by stamping the wall 15, 16. This stamped area 15e, 16e is arranged to come into contact with the portions of the tubes 2 so that it can be brazed to them; more precisely, its internal surface is brazed to the portions of the tubes 2. The term "portion of the tubes 2" signifies their walls extending in the plane defined by the direction of the length L of the exchanger 1 and the direction of the thickness h (or height h) of the exchanger 1. The function of this brazing is to prevent the circulation of water outside the water flow channels 3 formed between the tubes 2, and thus to ensure that the water flows only along the surfaces of the lateral walls of the tubes 2, to enable them to exchange the greatest possible amount of heat with the air flowing in the tubes 2. Thus the brazing of the indentations 15e, 16e of the casing 4 forces the water to circulate between the tubes 2. This brazing also increases the overall mechanical strength of the exchanger 1.

The forming of this indentation 15e, 16e in the walls 15, 16 is facilitated by the L-shape of these walls 15, 16, because this provides easy access for tools to both sides of each panel (15a, 15b), (16a, 16b).

Figure 8:
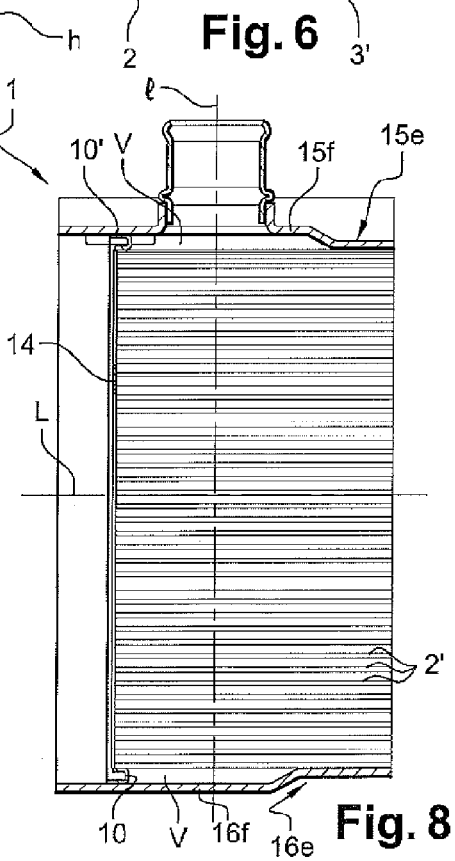
FIG. 8 is a sectional profile view of one end of the exchanger of FIG. 2.

The inner surfaces of the ends (15f, 15f'), (16f, 16f')—in the longitudinal direction L of the exchanger 1—of the small panel 15b, 16b of each wall 15, 16, on either side of the indentation 15e, 16e, extend at a distance from the portions of the tubes 2. Thus, at their end portions (15f, 15f'), (16f, 16f'), the walls 15, 16 combine with the portions of the tubes 2 to form a volume V (the same reference letter is used for all the volumes concerned); these volumes V are formed at both ends of the exchanger 1, on either side of the tubes 2. These volumes V are in fluid communication with the set of water flow channels 3. The holes 6, 7 for connection to the tubes 8, 9 of the water circuit are formed in these end portions (15f, 15f'), (16f, 16f') of the small panels 15b, 16b of the walls 15, 16, that is to say in separate portions of the indentations 15e, 16e; thus the water enters the exchanger 1 or leaves it through a volume V in communication with the set of water flow channels 3. It is also possible, because of the presence of these volumes V, to provide sufficient space for fitting the headers 10 at each end of the exchanger 1, as shown in FIG. 8. Incidentally, it should be noted that FIG. 8 is a sectional view taken inside a tube 2; it shows components which are parallel to each other, namely the walls of the fins 2' for disrupting the air flow.

Because of the arrangement of the walls 15, 16 and their indentations 15e, 16e with respect to the tubes 2, the exchanger 1 is supplied with water through the hole 7 connected to the water inlet tube 9 and the water flows into the volume V formed in the proximity of this hole 7, enabling the water to be distributed into all the water flow channels 3. The water flows into these channels 3 and is prevent from flowing beyond the portions of tubes 2, since the latter are brazed to the internal surfaces of the indentations 15e, 16e of the small panels 15b, 16b of the walls 15, 16; in other words, the water is confined in the channels 3 formed between the tubes 2, thus maximizing the heat exchange between the water and the air flowing in the tubes 2. The water is collected at the outlet in the volume V formed in the proximity of the hole 6 connected to the water outlet tube 8, and the water is discharged through this tube 8.

In fact, the indentations 15e, 16e brazed to the portions of the tubes 2 participate in the formation of the water circulation channels 3.

Incidentally, it should be noted that the water flows equally in volumes V formed by the ends 16f, 16f' of the small panel 16b of the second wall 16; these volumes V can ensure the correct distribution of the water but are not necessary; more particularly, they are formed because, in order to save manufacturing costs and facilitate their storage, it is preferable for the L-shaped walls 15, 16 to have strictly identical external shapes; thus, some components may be surplus but are retained in order to benefit from the identity of the external shapes of the walls 15, 16.

The end portions (15f, 15f'), (16f, 16f') of the walls 15, 16 are raised with respect to the corresponding indentation 15e, 16e, over their whole surface in this case. Clearly, the extent (in the longitudinal direction L of the exchanger 1) of these end portions (15f, 15f'), (16f, 16f') can vary. Their shape can also vary; for example, the end portions can be conical around the hole 6, 7 for accommodating a tube 8, 9; in this case, all the unpierced end portions 16f, 16f' preferably have the same shape, for the same reasons of the identity of the external shape of the walls 15, 16 as those explained above.

Preferably, the disrupters 3' fitted in the water flow channels 3 do not extend, in the longitudinal direction L of the exchanger 1, as far as the end of the tubes 2, and therefore do not extend as far as the headers 10. Thus a water collection volume with no disrupters 3' is formed.

A specific characteristic of the walls 15, 16 will now be described. FIG. 7 shows that, in the proximity of the contact area between the raised edge 15c, 16c of the small panel 15b, 16b of each wall 15, 16 and the large panel 16a, 15a of the other wall 16, 15, there is an area in which there is a gap J between the walls and the corner of the header 10 (these two gaps which are diagonally opposed on the exchanger 1 are both denoted by the same reference J). It should be noted that there is no such gap at the bending corners 15', 16' between the small and large panels (15b, 16b), (15a, 16a) of the walls 15, 16, since in this case the inner surface of this bending corner 15', 16' mates with the outer surface of the corresponding corner of the header 10.

Because of the presence of these gaps J, there is a risk of water leakage through them. This is why each wall 15, 16 has, in the proximity of each free corner of its large panel 15a, 16a, a sealing portion P (all the sealing portions of the exchanger 1 are denoted by the same reference P). Each sealing portion P takes the form of a portion projecting beyond the inner surface of the large panel 15a, 16a of the wall 15, 16 towards the tubes 2; this projecting portion P takes the form of a corner or a fin. A projecting portion P of this kind can either be stamped on the wall 15, 16 after its manufacture, or can be formed directly during the manufacture of the wall 15, 16.

FIG. 9 clearly shows the positioning and consequently the function of this sealing portion P. It is evident that the sealing portion P comes into contact with the outer surface of the corner of the header 10 and with the facing surface of the bending corner 16d of the raised edge 16c of the small panel 16b of the second wall 16. The various parts are brazed in these contact areas, thus eliminating the gap J at these points and preventing any flow of water. The sealing portions P do not extend very far in the longitudinal direction L of the exchanger 1, because it is sufficient for them to be present in the proximity of the headers 10 in order to avoid leakage of water. Thus the sealing portions P are designed to fill a gap J in the area where the wall 15, 16 to which they belong is fixed to the other wall 16, 15, between the walls 15, 16 and the headers 10. Clearly, the description in this paragraph is applicable to all four sealing portions P of the exchanger 1.

Figure 17:
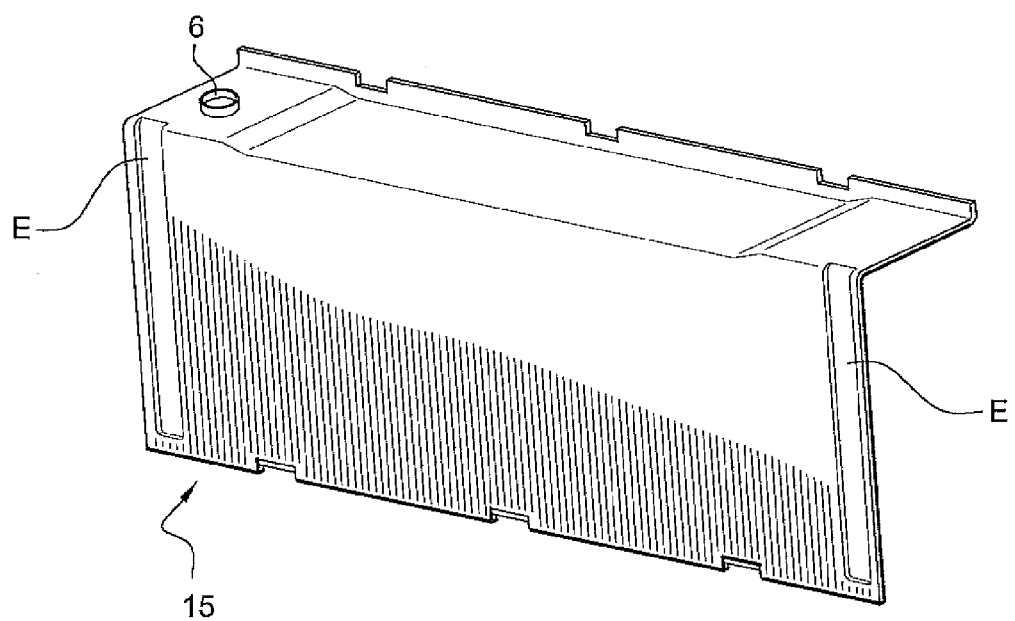
FIG. 17 is a perspective view of the wall of a casing in a specific embodiment.

FIG. 17 shows an L-shaped wall 15 in a specific embodiment. This wall 15 has only one hole 6 for connection to a water tube 8, in this case the water outlet tube 8; as before, this hole 6 is formed in the proximity of one end of the small panel 15b of the wall 15. In this case, the other water tube (the inlet tube 9) is connected to a hole formed in the other L-shaped wall (not shown); preferably, it is also formed in its small panel and at its end opposite that of the wall 15 shown in FIG. 17.

It should be noted that the wall 15 of FIG. 17 has two widened areas E, in the direction of the height h of the exchanger 1, formed in the proximity of each end of its large panel 15a. In this case, these widened areas E are formed by stamping the wall 15. They are provided if the dimensions of the header 10 are larger, in the direction of the height h of the exchanger 1, than the dimension of the small panels 15b of the L-shaped walls 15; the widened areas E (or stamped areas E) are therefore used for housing the header 10. These stamped areas E provide an additional advantage: if they house the headers 10 in the direction of the height h of the exchanger 1, they form a stop in the longitudinal dimension L of the exchanger 1; thus they form means for holding the headers 10 and consequently all the exchange components 2, 2', 3, 3' axially (in this direction L) during the brazing of the set of components of the exchanger 1 (if they are brazed).

It should be noted that these widened areas E can be provided in walls according to the embodiments of FIGS. 1 to 10 or the embodiments of FIGS. 1 to 15. The same applies to the presence of a single hole 6 for connection to a water tube, regardless of the presence or absence of widened areas E. This is because the difference between the embodiments of FIGS. 1 to 10 and FIGS. 11 to 15 relates to their method of fixing to the fluid distribution housings.

The fixing of the manifold 11 to the exchanger 1 will now be described. The fixing of the manifold (not shown) located on the right-hand side of the exchanger 1 will not be described, but is entirely similar.

The manifold 11 is held directly by the casing 4 of the exchanger 1. It should be noted that, in the embodiments illustrated here, the manifold 11 is held inside the casing 4. In other words, the casing 4 covers at least part of the manifold 11 in this case. More specifically, the casing 4 encloses the part of the manifold 11 located in the proximity of (or in contact with) the header 10.

In the embodiment of FIGS. 1 to 10, the manifold 11 is metallic and the casing 4 and the manifold 11 are brazed to each other, as shown for example in FIG. 3; the manifold 11 can be formed from aluminum, for example. For this purpose, the edge of the manifold 11 which is to be brazed to the casing 4 has a shoulder 17 serving as a stop for the ends (in the longitudinal direction L) of the walls 15, 16 of the casing 4. The shoulder 17 is designed to have a bearing surface with a shape complementary to the end shape of the walls 15, 16 to which the manifold 11 is brazed, to provide continuity of the outer surface of the exchanger 1 between the walls 15, 16 of the casing 4 and the manifold 11. The shoulder 17 preferably extends along the whole periphery of the edge of the manifold 11. The brazing between the casing 4 and the manifold 11 is thus easy to carry out.

The fact that the manifold 11 is fixed directly to the casing 4 reduces the overall dimensions of the exchanger 1. This is because the header 10 is contained within the volume of the casing 4 and does not project beyond it; in other words, the overall dimensions of the exchanger 1 are determined by the dimensions of the casing 4. This provides a satisfactory optimization of the ratio between the flow rate of the fluid in the exchanger 1 and its overall dimensions. This is because, regardless of the configuration of the fixing of the manifold 11 to the exchanger 1 (with fixing directly to the casing or by means of the header as in the prior art), the maximum flow cross section of the fluids is always restricted by the dimensions of the casing 4, since the flow of all the fluids takes place within the casing 4. If the manifold 11 is fixed directly to the casing 4, the overall dimensions created by this combination can also be limited to the overall dimensions of the casing 4; thus the overall dimensions of the exchanger 1 correspond to the overall dimensions of the casing 4, which are directly related to the flow cross section of the fluids; the overall dimensions are therefore optimized, as they are minimal for a given fluid passage cross section.

It will be noted that, as shown in FIG. 10, the distance d between the end of the manifold 11 and the header 10 is not zero. In one embodiment, the manifold 11 can be welded to the walls 15, 16 of the casing 4 instead of being brazed; this can be done because, owing to said distance d, there is no risk of the welding causing the melting of the brazed joint between the tubes 2 and the header 10.

It should be noted that the header 10 is also held by the casing 4, in this case by brazing along the outer walls 10' of its peripheral edge.

A second embodiment of the exchanger 1 is described with reference to FIGS. 11 to 15. This embodiment is very similar to the preceding embodiment, which is why the references used for the exchanger components of FIGS. 11 to 15 having an identical, equivalent or similar structure or function to those of the exchanger components of FIGS. 1 to 10 are the same, in order to simplify the description. Furthermore, the whole description of the exchanger of FIGS. 1 to 10 will not be repeated, as this description is applicable to the exchanger of FIGS. 11 to 15 where there is no incompatibility. Only the notable differences in terms of structure and function will be described.

The exchanger 1 of FIGS. 11 to 15 has the following distinctive feature: the manifold 11 (only the end portion of which is visible) of the distribution housing 5, which is held directly by the casing 4, is fixed to the casing not by brazing or welding as described above, but by crimping.

For this purpose, the ends (in the longitudinal direction L of the exchanger 1) of the walls 15, 16 include lugs 18 for crimping on to the manifold 11. In this case, the two panels (15a, 15b), (16a, 16b) of each wall 15, 16 include, at each of their ends, crimping lugs 18; each edge of each panel (15a, 15b), (16a, 16b) in this case includes three crimping lugs 18 uniformly distributed along the edge concerned; the crimping lugs 18 of the large panels 15a, 16a have larger dimensions than the crimping lugs 18 of the small panels 15b, 16b.

The edge of the manifold 11 which is to come into contact with the walls 15, 16 of the casing 4 has a rim 19 on which the crimping lugs 18 can bear; this rim 19 forms a channel to receive the crimping lugs 18. The crimping lugs 18 of the casing 4 are bent over and pressed into the receiving channel of the manifold 11, thus holding the latter directly. The lugs 18 of the casing 4 therefore interact with a surface of the manifold 11 (the surface of the channel of the rim 19) to hold the manifold 11.

In the described embodiment, the header 10 is also held by the casing 4. For this purpose, the panels (15a, 15b), (16a, 16b) of the walls 15, 16 of the casing 4 include stops 20, formed in this case by stamping the panels (15a, 15b), (16a, 16b). These stops 20 project beyond the internal surfaces of the panels (15a, 15b), (16a, 16b). With reference to FIG. 15, the external edge of the header 10 is trapped, in other words stopped on either side (in the longitudinal direction L of the exchanger 1) by the rim 19 of the manifold 11 and the stops 20 of the walls 15, 16 of the casing 4. In other words, the rim 19 of the manifold 11 and the header 10 are kept in position between the stops 20 and the crimping lugs 18 of the walls 15, 16 of the casing 4; thus, as a result of the crimping, the lugs 18 exert a force on the manifold 11 and the header 10, which they hold in position between themselves and the stops 20. In this case, two stops 20 are provided in the proximity of the end of each panel (15a, 15b), (16a, 16b) of each wall 15, 16.

According to the described embodiment, a sealing joint 21 is inserted between the end portion 22 of the edge of the manifold 11 and a channel 23 formed on the periphery of the header 10; this channel 23 extends along the whole periphery of the edge of the header 10, and has a U-shaped cross section whose opening faces the manifold 11. This joint 21 provides air-tightness between the manifold 11 and the header 10. It is made from elastomer, for example.

Incidentally, it should be noted that FIG. 15 is a section taken in a plane located between two flanges 13 at the position of a stop 20. This is why this drawing shows a space on the inner side of the seal ring 21. This space is only present between two flanges 13, and the other drawings show that the ring 21 is also properly flattened in the channel 23 of the header 10, thus correctly performing its sealing function.

In an alternative embodiment, the seal between the manifold 11 and the header 10 to which it is fixed is provided by brazing. For this purpose, the end portion 22 of the edge of the manifold 11 is brazed directly into the channel 23. This produces an exchanger 1 with the casing 4 crimped on to the manifold 11, and with the latter brazed to the header 10. In other words the sealing means between the header 10 and the manifold 11 comprise a brazed joint.

Regardless of the type of embodiment (sealing by means of a ring or by brazing), the exchanger 1 with its casing 4 crimped on to the manifold 11 has all the advantages listed above in relation to the first embodiment in which they are brazed, owing to the fact that the manifold 11 is held directly by the casing 4. It also has all the advantages arising from fixing by crimping. In particular, it is possible to provide a manifold 11 formed from plastic material, which is not the case with fixing by brazing or welding, for which the manifold 11 has to be made from metal; clearly, the method of fixing the manifold 11 to the casing 4 by crimping can also be used with a metal manifold 11.

It should be noted that the crimping of the manifold 11 by the casing 4 in this way has a further advantage over the crimping known in the prior art between a header and a manifold: the thickness of the walls 15, 16 of the casing 4 of an exchanger 1 is generally greater than the thickness of the wall forming its header 10 (for example, 1 mm for the wall of the header 10 as against 2 mm for the wall of the casing 4); this is even more relevant in the case of a metal header 10, made of aluminum for example, which has already undergone heat treatment for its brazing to the other components, said treatment weakening its mechanical strength. Since it is carried out directly by the casing 4, the fixing by crimping is more rigid and is not subject to any risk of deformation. Furthermore, the header 10 is not stressed and is therefore not subject to any risk of deformation.

The operation of the exchanger 1 (regardless of its embodiment) is as follows (this is described briefly as it is already well known to persons skilled in the art). Air is supplied to the air inlet distribution housing 5, flows into the tubes 2 (this flow being disrupted by the fins 2') and flows out of the exchanger 1 through the air outlet distribution housing (not shown). The exchanger is also supplied with water through the water inlet tube 9, circulates in the water flow channels 3 (this circulation being disrupted by the disrupters 3') and flows out of the exchanger 1 through the water outlet tube 8. The air and water flow in opposite directions with respect to the longitudinal direction L of the exchanger 1; the exchanger 1 is therefore of the type known as a counter-flow exchanger, which has a very high efficiency.

The heat exchanger 1 has been described in terms of air circulating in the tubes 2 and water circulating between the tubes across disrupters 3'. Clearly, this arrangement could be reversed, with water in the tubes and air between the tubes. It would also be possible to use air in both cases or water in both cases, or other fluids.

The different characteristics, as described above, of the different components of the exchanger can be combined or provided independently of each other, provided that this is compatible.

The invention claimed is:

1. A heat exchanger having exchange and fluid flow components (2, 2'), at least one fluid manifold (11) into which the exchange components (2, 2') open, at least one header plate (10) for holding the exchange components (2, 2'), and a casing (4) for accommodating the exchange components (2, 2'), wherein the fluid manifold (11) has a portion extending inside the casing (4) and being held directly by the casing (4), wherein the fluid manifold (11) includes an edge having a recessed shape to receive a complementary shape of one end of a wall (15) of the casing (4) and having a shoulder (17) serving as a stop for the one end of the wall (15) such that the at least one header plate (10) is spaced from the shoulder (17) and the wall (15) overlaps the edge to which it is welded or brazed to provide continuity of an outer surface between the fluid manifold (11) and the casing (4) of the heat exchanger, wherein a thickness of the wall (15) is greater than a thickness of a wall forming the at least one header plate (10).

2. The exchanger as claimed in claim 1, in which the header plate (10) is also held by the casing (4).

3. The exchanger as claimed in claim 1, in which the fluid manifold (11) and the casing (4) are welded or brazed.

4. The exchanger as claimed in claim 1, in which the casing (4) has two L-shaped walls (15, 16).

* * * * *